US011935710B2

(12) United States Patent
Sasaki et al.

(10) Patent No.: US 11,935,710 B2
(45) Date of Patent: Mar. 19, 2024

(54) ROTARY OPERATING DEVICE

(71) Applicant: ALPS ALPINE CO., LTD., Tokyo (JP)

(72) Inventors: Kazuya Sasaki, Miyagi (JP); Mariko Ito, Miyagi (JP); Keisuke Yamazaki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 76 days.

(21) Appl. No.: 17/932,766

(22) Filed: Sep. 16, 2022

(65) Prior Publication Data

US 2023/0016718 A1 Jan. 19, 2023

Related U.S. Application Data

(63) Continuation of application No. PCT/JP2021/010928, filed on Mar. 17, 2021.

(30) Foreign Application Priority Data

Mar. 27, 2020 (JP) ................................ 2020-058465

(51) Int. Cl.
*H01H 19/14* (2006.01)
*H01H 1/58* (2006.01)
*H01H 19/06* (2006.01)

(52) U.S. Cl.
CPC .......... *H01H 19/06* (2013.01); *H01H 1/5805* (2013.01); *H01H 19/14* (2013.01); *H01H 2207/008* (2013.01)

(58) Field of Classification Search
CPC ...... H01H 19/14; H01H 19/11; H01H 19/585; H01H 19/58; H01H 19/62; H01H 19/635;
(Continued)

(56) References Cited

U.S. PATENT DOCUMENTS 7,087,848 B1 * 8/2006 Yamasaki ............ H01H 25/041 200/18
2008/0041709 A1 2/2008 Koizumi et al.
(Continued)

FOREIGN PATENT DOCUMENTS

JP S60-012544 U 4/1985
JP 2008-004504 1/2008
(Continued)

OTHER PUBLICATIONS

International Search Report for PCT/JP2021/010928 dated Jun. 15, 2021.

*Primary Examiner* — Ahmed M Saeed
(74) *Attorney, Agent, or Firm* — IPUSA, PLLC

(57) ABSTRACT

A rotary operating device includes a case, a rotating shaft member, an operation member, and a sensor. The case has a cavity having an annular shape with an opening at a top. The rotating shaft member is rotatable with respect to the case. The operation member rotates together with the rotating shaft member. The sensor is disposed within the cavity to detect rotation of the rotating shaft member. The case has an inner peripheral wall. The operation member has an inner cylindrical portion. The rotating shaft member has a peripheral wall that extends downward and along an outer peripheral surface of the inner peripheral wall. A first gap between the inner peripheral wall of the case and the peripheral wall of the rotating shaft member is smaller than a second gap between an inner peripheral surface of the rotating shaft member and the inner cylindrical portion of the operation member.

6 Claims, 7 Drawing Sheets

(58) Field of Classification Search
CPC ...... H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01
See application file for complete search history.

(56) References Cited

U.S. PATENT DOCUMENTS

2018/0238550 A1* 8/2018 Ha .......................... F24C 3/126
2019/0051468 A1* 2/2019 Turner ..................... G05G 1/12

FOREIGN PATENT DOCUMENTS

JP 2014-089814 5/2014
JP 2017-130265 7/2017

* cited by examiner

ROTARY OPERATING DEVICE

CROSS-REFERENCE TO RELATED APPLICATIONS

This application is a continuation of International Application No. PCT/JP2021/010928, filed on Mar. 17, 2021 and designating the U.S., which claims priority to Japanese Patent Application No. 2020-058465 filed on Mar. 27, 2020. The contents of these applications are incorporated herein by reference in their entirety.

BACKGROUND OF THE INVENTION

1. Field of the Invention

The present invention relates to a rotary operating device.

2. Description of the Related Art

Patent Document 1 below discloses a structure for installing a washing machine operation switch, and more specifically, a technique that prevents terminals from becoming wet by engaging a rib formed on the bottom surface of an operation box with a rib formed on the top surface of an installation plate, such that water entering from the vicinity of an operation bottom is blocked and flows out of a drain hole.

Conventionally, rotary operating devices are known that include an operation member rotatably provided with respect to a case, and a sensor provided within the case. Further, conventionally, when such a rotary operating device has a waterproof structure to prevent a sensor from becoming wet, a sealing member such as an O-ring needs to be provided between an operation member and a case. However, if the seal member is provided in the rotary operating device, not only the number of parts increases, but also the rotational load of the operation member increases, thus making it difficult to provide an operator with a lightsome rotational feeling.

RELATED-ART DOCUMENTS

Non-Patent Documents

Patent Document 1: Japanese Examined Utility Model Publication No. 60-12544

SUMMARY OF THE INVENTION

According to an embodiment, a rotary operating device includes a case, a rotating shaft member, an operation member, and a sensor. The case has a cavity having an annular shape with an opening at a top. The rotating shaft member has an annular shape, is rotatable with respect to the case, and closes the cavity. The operation member has an annular shape with an opening at a bottom, covers the cavity, engages with the rotating shaft member, and rotates together with the rotating shaft member. The sensor is disposed within the cavity to detect rotation of the rotating shaft member. The case has an inner peripheral wall having an annular shape. The operation member has an inner cylindrical portion having an annular shape. The rotating shaft member has a peripheral wall that extends downward and extends along an outer peripheral surface of the inner peripheral wall. A first gap between the inner peripheral wall of the case and the peripheral wall of the rotating shaft member is smaller than a second gap between an inner peripheral surface of the rotating shaft member and the inner cylindrical portion of the operation member.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

In the following, an embodiment will be described with reference to the accompanying drawings.

(Outline of Rotary Operating Device 100)

Figure 1:
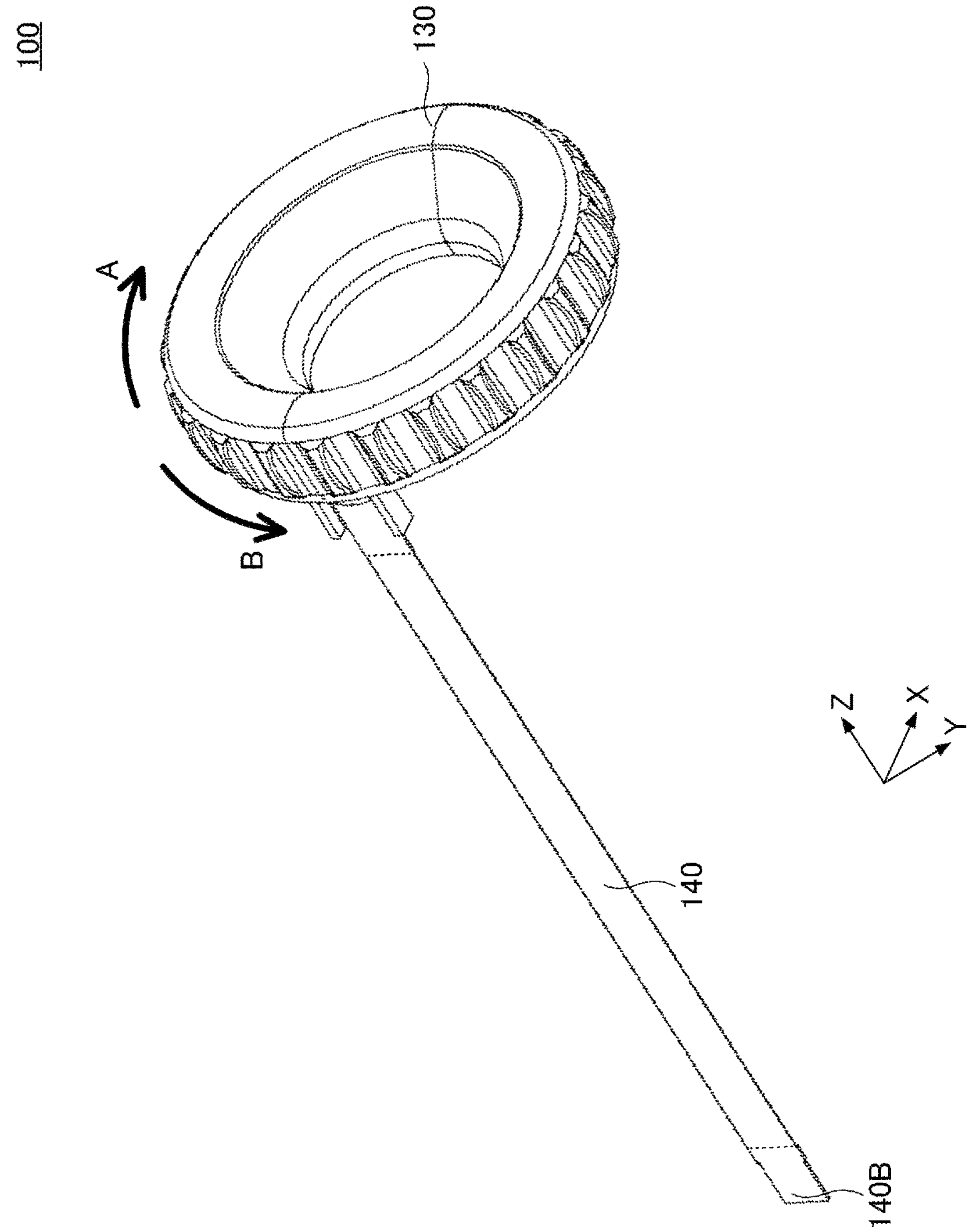
FIG. 1 is a perspective view of the exterior of a rotary operating device (to which a knob is attached) according to an embodiment.
Figure 2:
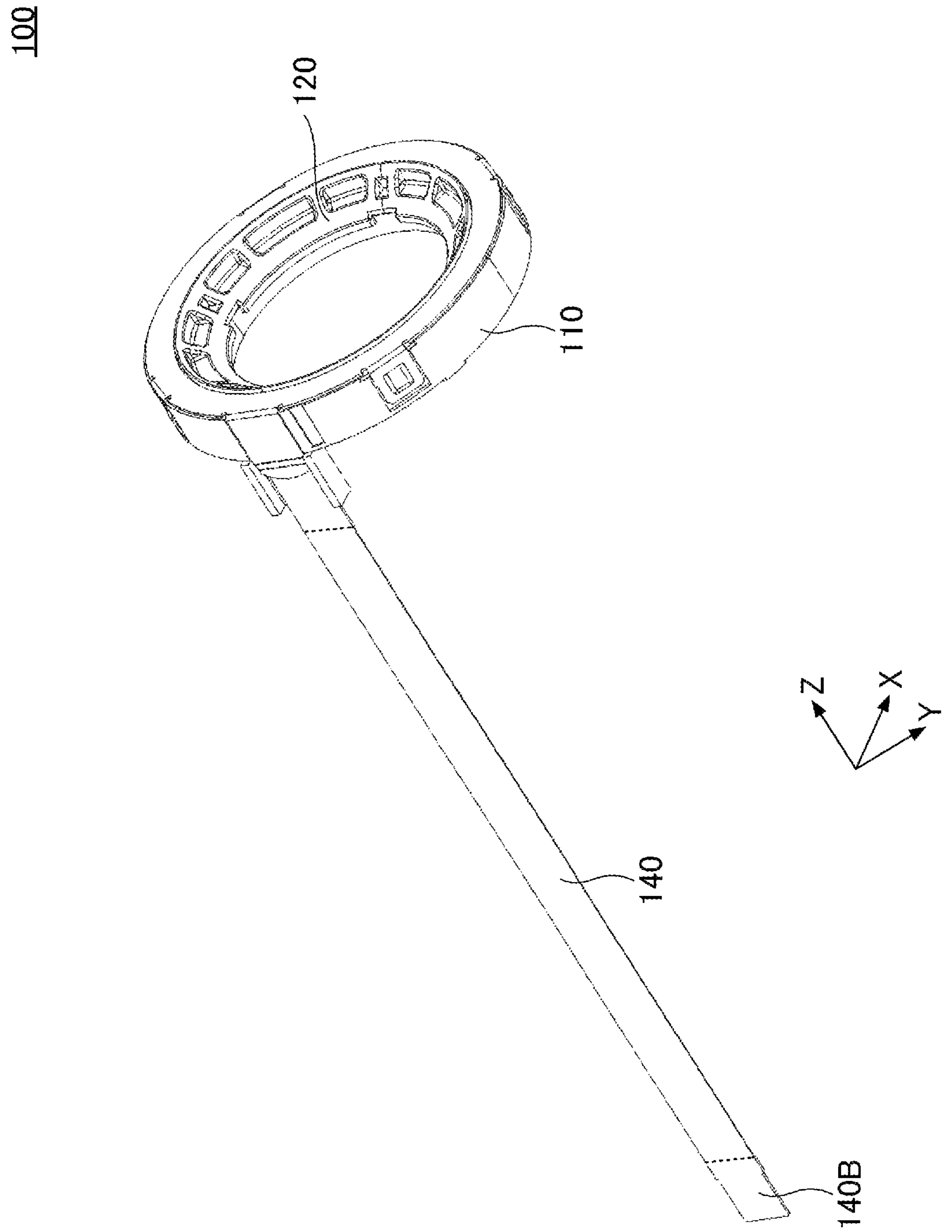
FIG. 2 is a perspective view of the exterior of the rotary operating device (from which the knob is removed) according to the embodiment.

FIG. 1 is a perspective view of the exterior of a rotary operating device 100 (to which a knob is attached) according to an embodiment. FIG. 2 is a perspective view of the exterior of the rotary operating device 100 (from which the knob is removed) according to the embodiment. In the following description, the thickness direction of the rotary operating device 100 is referred to as an upper-lower direction (Z-axis direction), and the radial direction of the rotary operating device 100 is referred to as a front-rear direction (X-axis direction) and a left-right direction (Y-axis direction), for the sake of convenience.

The rotary operating device 100 illustrated in FIG. 1 and FIG. 2 is installed in a vehicle such as an automobile, and is used for operation of an in-vehicle device (such as an air conditioner) installed in the vehicle. As illustrated in FIG. 1 and FIG. 2, the rotary operating device 100 has a relatively thin cylindrical shape. The rotary operating device 100 is installed at a position (For example, a center console) so as to be operable by an operator in the vehicle.

The rotary operating device 100 includes a case 110, a rotating shaft member 120, and a knob 130. The case 110 is a member whose bottom surface is fixed to a predetermined installation surface. The rotating shaft member 120 is rotatable with respect to the case 110.

The knob 130 is an example of an "operation member". The knob 130 has an annular shape with an opening at the bottom, and covers the inside, the top, and the outside of the case 110. The knob 130 rotates together with the rotating shaft member 120 by being rotated by the operator. The knob 130 is rotatable both clockwise (in a direction indicated by the arrow A in FIG. 1) and counterclockwise (in a direction indicated by the arrow B in FIG. 1).

Further, the rotary operating device 100 includes a flexible printed circuit (FPC) 140 that extends downward from the case 110. The rotary operating device 100 can detect a rotation operation performed on the knob 130 by using two photo interrupters 141 and 142 (see FIG. 3) provided on the FPC 140 within the case 110, and output an operation signal, corresponding to the rotation operation, to an external device via the FPC 140.

(Configuration of Rotary Operating Device 100)

Figure 3:
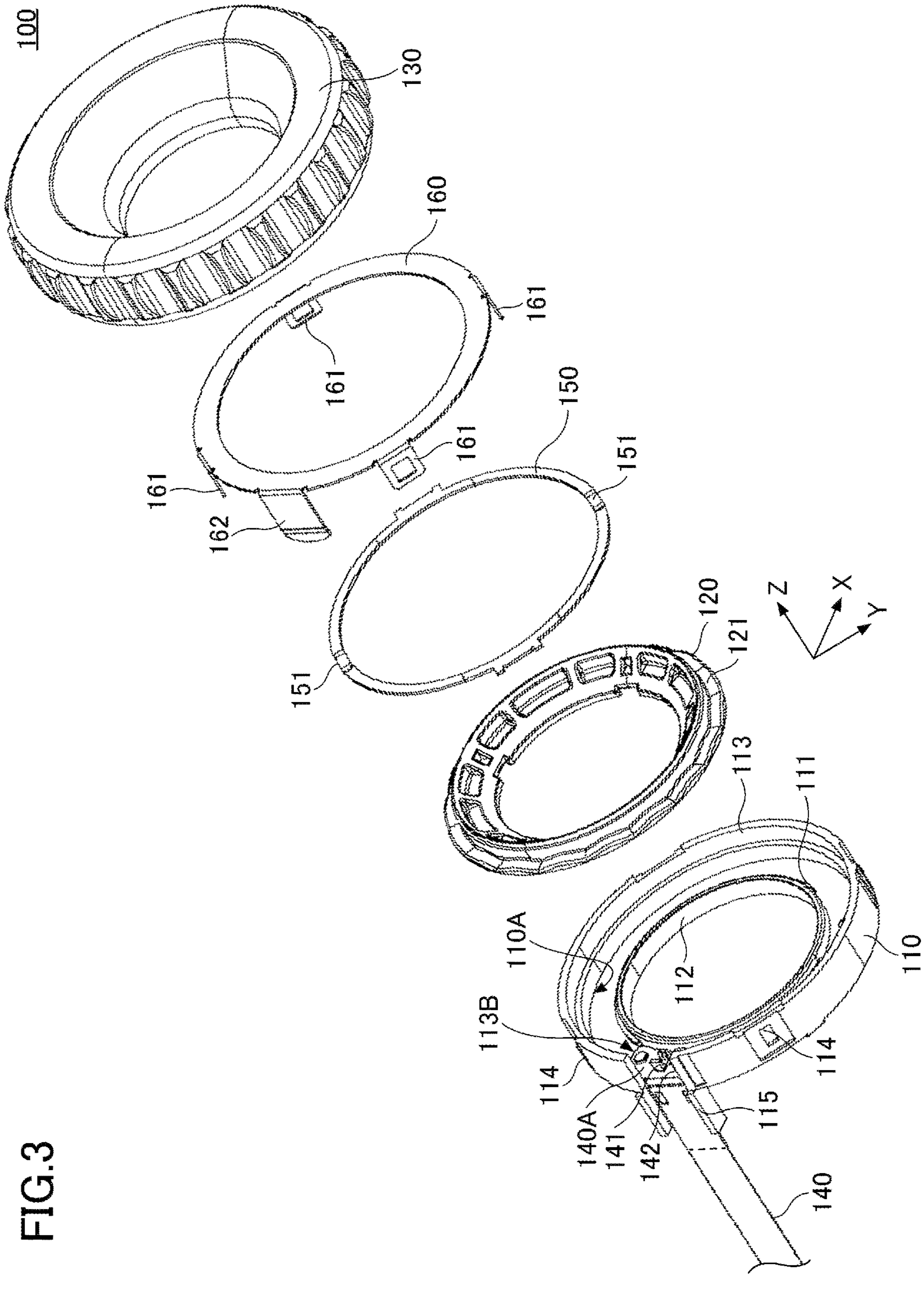
FIG. 3 is an exploded perspective view of the rotary operating device according to the embodiment.
Figure 4:
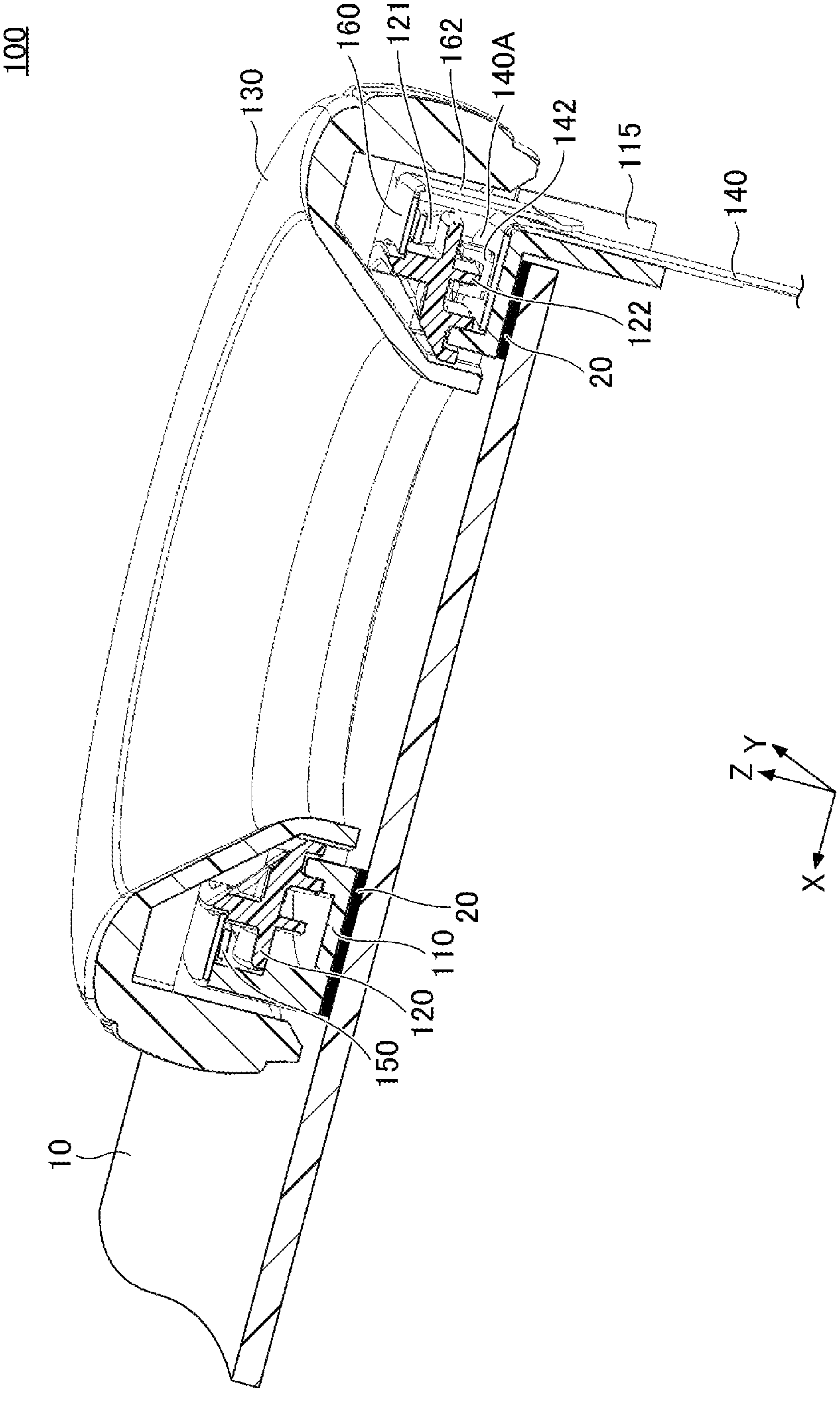
FIG. 4 is a cross-sectional view of the rotary operating device according to the embodiment.

FIG. 3 is an exploded perspective view of the rotary operating device 100 according to the embodiment. FIG. 4 is a cross-sectional view of the rotary operating device 100 according to the embodiment. FIG. 4 depicts the rotary operating device 100 in a state of being installed on an installation surface 10 that is inclined downward and rearward.

As illustrated in FIG. 3 and FIG. 4, the rotary operating device 100 includes the case 110, the rotating shaft member 120, the knob 130, the FPC 140, a leaf spring 150, and a lid 160.

The case 110 is a member serving as a base portion of the rotary operating device 100, made of a resin, and having an annular shape. The case 110 has a bottom wall 111, an inner peripheral wall 112, and an outer peripheral wall 113, and thus has a cavity 110A having an annular shape with an opening at the top.

The FPC 140 is an example of a "flexible substrate", and is a strip-shaped and film-shaped wiring member having flexibility. The FPC 140 extends downward from a notch portion 113B of the outer peripheral wall 113 of the case 110. One end 140A of the FPC 140 is disposed horizontally with respect to the upper surface of the bottom wall 111 of the case 110. The two photo interrupters 141 and 142 are provided on the one end 140A of the FPC 140. The photo interrupters 141 and 142 are an example of a "sensor". The photo interrupters 141 and 142 detect the rotation of the rotating shaft member 120, and output rotation detection signals. Each of the photo interrupters 141 and 142 includes a light emitting element and a light receiving element, and outputs, as a rotation detection signal, a signal for identifying whether light emitted from the light emitting element is received by the light receiving element (that is, whether light is blocked by a light blocking portion 122 (see FIG. 4) that extends downward from the lower surface of the rotating shaft member 120). The other end 140B (see FIG. 1 and FIG. 2) of the FPC 140 is connected to an external device. The FPC 140 can transmit rotation detection signals, output from the two photo interrupters 141 and 142, to the external device. The external device can identify the rotation direction of the rotating shaft member 120 by identifying the light-blocking order of the two photo interrupters 141 and 142 based on the rotation detection signals output from the two photo interrupters 141 and 142. The FPC 140 is formed by, for example, covering the surfaces of a strip-shaped conductor wire (for example, copper foil) with a flexible and insulating material (for example, polyimide resin, polyethylene terephthalate (PET), or the like).

The rotating shaft member 120 is a member having an annular shape, rotatable with respect to the case 110, and closing the cavity 110A of the case 110. A cam surface 121 is formed on the outer periphery of the rotating shaft member 120. The cam surface 121 has a configuration in which a plurality of cam lobes are continuously provided in the circumferential direction.

The leaf spring 150 is an elastic member made of a metal and having an annular shape. The leaf spring 150 is disposed to overlap with the cam surface 121 of the rotating shaft member 120. The leaf spring 150 has a pair of protrusions 151 arranged at intervals of 180°. The protrusions 151 are portions that are curved and protrude downward. The protrusions 151 are pressed against the cam surface 121 of the rotating shaft member 120 by the lid 160 preloading the leaf spring 150 downward. The protrusions 151 slide on the cam surface 121 as the rotating shaft member 120 is rotated. Accordingly, the protrusions 151 can provide a click feeling at each predetermined rotation angle when the rotating shaft member 120 is rotated (that is, when the knob 130 is rotated).

The lid 160 is a member made of a metal and having an annular flat plate shape. The lid 160 is attached to the case 110 so as to close the upper side of the cavity 110A in a state in which the rotating shaft member 120 and the leaf spring 150 are assembled into the cavity 110A of the case 110. Thus, the lid 160 restricts the upward movement of the rotating shaft member 120 and the leaf spring 150. Four hooks 161 are provided on the outer peripheral edge of the lid 160 at intervals of 90° and project downward from the outer peripheral edge of the lid 160. The lid 160 is fixed to the case 110 by engaging the four hooks 161 with respective four projections 114 that are provided on the outer peripheral surface of the case 110 at intervals of 90°. A pressing portion 162 is provided on the outer peripheral edge of the lid 160 at a position corresponding to the position from which the FPC 140 extends, and projects downward from the outer peripheral edge of the lid 160. A guide portion 115, extending downward, is provided on the outer peripheral edge of the case 110, that is, provided below the notch portion 113B, from which the FPC 140 extends, of the outer peripheral wall 113. The pressing portion 162 presses the FPC 140 (a portion of the FPC 140 guided by the guide portion 115), which extends downward from the notch portion 113B of the outer peripheral wall 113 of the case 110, against the guide portion 115 of the case 110. Accordingly, the pressing portion 162 can prevent the FPC 140 from separating from the guide portion 115. Further, the pressing portion 162 contacts ground wiring (not illustrated) exposed on the surface of the FPC 140. Accordingly, the pressing portion 162 can release static electricity generated in the rotary operating device 100 to the ground wiring through the lid 160 and the pressing portion 162.

(Water-Stop Structure of Rotary Operating Device 100)

Figure 5:
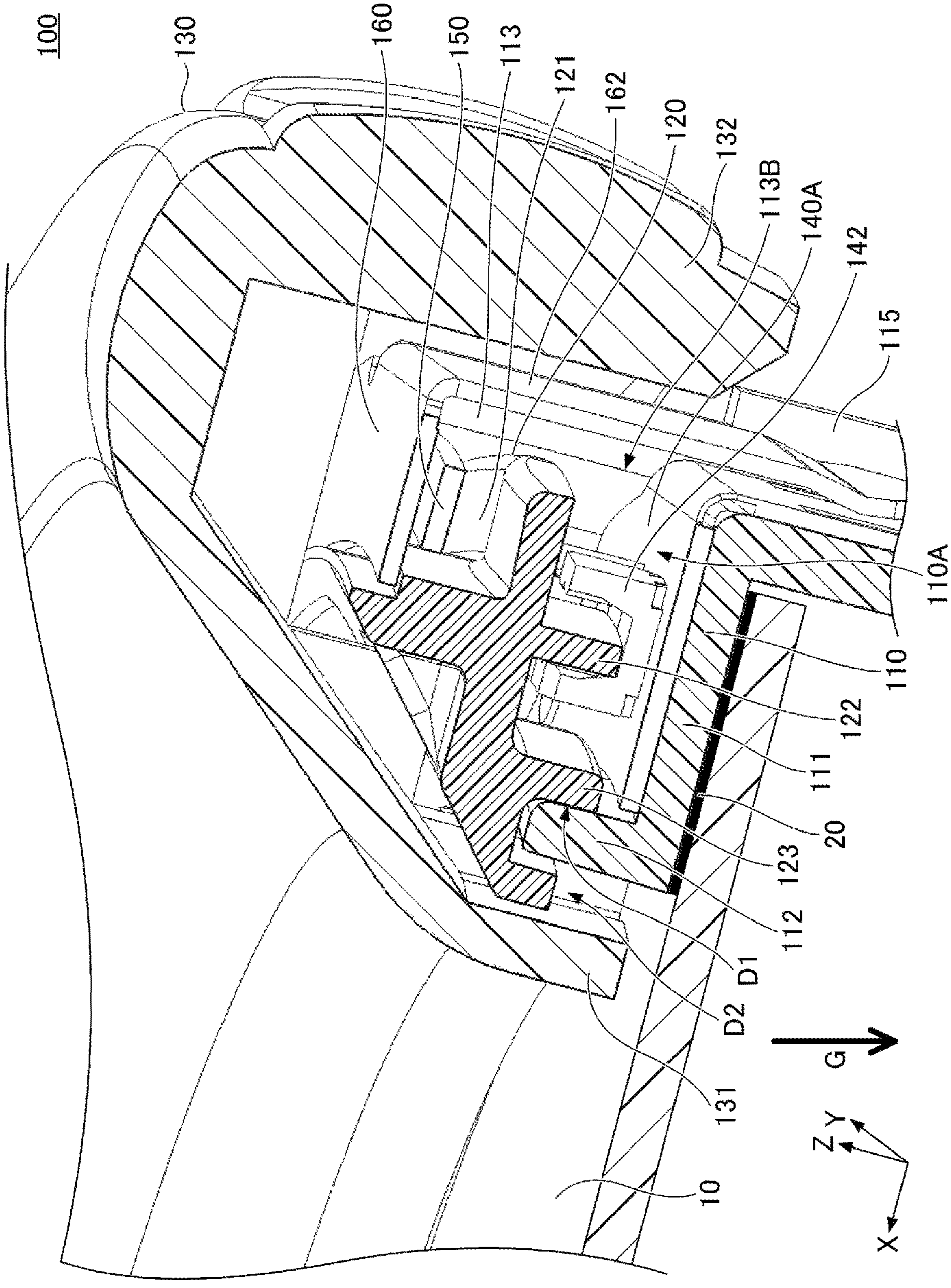
FIG. 5 is a partially enlarged view of the rotary operating device of FIG. 4.
Figure 6:
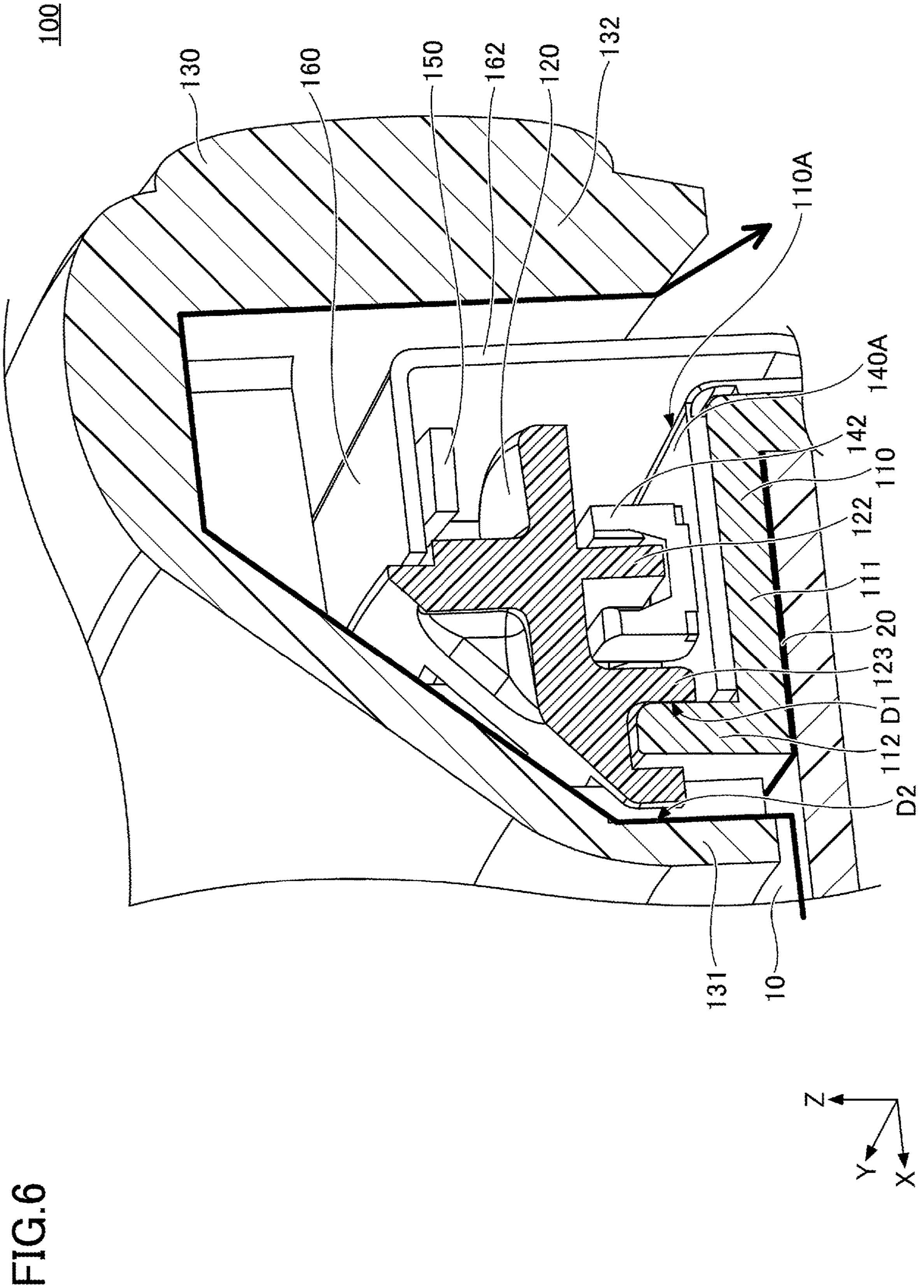
FIG. 6 is a drawing illustrating a liquid flow path in the rotary operating device according to the embodiment.

FIG. 5 is a partially enlarged view of the rotary operating device 100 of FIG. 4. FIG. 6 is a drawing illustrating a liquid flow path in the rotary operating device 100 according to the embodiment. In FIG. 5 and FIG. 6, the arrow G indicates the direction of gravity.

As illustrated in FIG. 5 and FIG. 6, the case 110 has the inner peripheral wall 112 having an annular shape. The inner peripheral wall 112 provided vertically from the inner peripheral edge of the bottom wall 111 having an annular shape. Conversely, as illustrated in FIG. 5, the rotating shaft member 120 has a peripheral wall 123 having an annular shape. The peripheral wall 123 extends downward and extends along the outer peripheral surface of the inner peripheral wall 112 of the case 110. A significantly small first gap D1 is formed between the outer peripheral surface of the inner peripheral wall 112 and the inner peripheral surface of the peripheral wall 123.

Further, as illustrated in FIG. 5 and FIG. 6, the knob 130 includes an inner cylindrical portion 131 having an annular shape. The inner cylindrical portion 131 is located on the innermost side (rotation center side) of the knob 130. The inner cylindrical portion 131 is disposed inward (on the rotation center side) relative to the inner peripheral wall 112 of the case 110. A second gap D2 is formed between the outer peripheral surface of the inner cylindrical portion 131 and the inner peripheral surface of the rotating shaft member 120.

As illustrated in FIG. 5 and FIG. 6, the first gap D1 between the outer peripheral surface of the inner peripheral wall 112 of the case 110 and the inner peripheral surface of the peripheral wall 123 of the rotating shaft member 120 is smaller than the second gap D2 between the outer peripheral surface of the inner cylindrical portion 131 of the knob 130 and the inner peripheral surface of the rotating shaft member 120.

Accordingly, as indicated by the thick arrow in FIG. 6, the rotary operating device 100 according to the embodiment is configured such that, a liquid such as water, which has entered between the inner cylindrical portion 131 of the knob 130 and the inner peripheral wall 112 of the case 110 from below the inner cylindrical portion 131 of the knob 130, passes through the second gap D2 that is larger than the first gap D1, flows along the inner surface of the knob 130, and is discharged to the outside of the rotary operating device 100 from between the inner peripheral surface of the outer cylindrical portion 132 of the knob 130 and the outer peripheral surface of the outer peripheral wall 113 of the case 110.

That is, the rotary operating device 100 according to the embodiment is configured such that the first gap D1 that is smaller than the second gap D2 can prevent a liquid such as water, which has entered between the inner cylindrical portion 131 of the knob 130 and the inner peripheral wall 112 of the case 110, from entering the cavity 110A of the case 110. Accordingly, the rotary operating device 100 according to the embodiment can prevent the photo interrupters 141 and 142 provided within the cavity 110A from becoming wet.

As illustrated in FIG. 5 and FIG. 6, the pressing portion 162, projecting downward from the outer peripheral edge of the lid 160, is situated on the lower side in the direction of gravity upon installing the rotary operating device 100 on the installation surface 10. Accordingly, the rotary operating device 100 according to the embodiment can cause a liquid, flowing between the inner peripheral surface of the outer cylindrical portion 132 of the knob 130 and the outer peripheral surface of the outer peripheral wall 113 of the case 110, to be discharged to the outside of the rotary operating device 100 along the pressing portion 162.

Further, the outer peripheral wall 113 of the case 110 has the notch portion 113B from which the FPC 140 extends downward. Therefore, even if a liquid enter the cavity 110A of the case 110, the rotary operating device 100 according to the embodiment can discharge the liquid from the notch portion 113B formed on the lower side in the direction of gravity.

Figure 7:
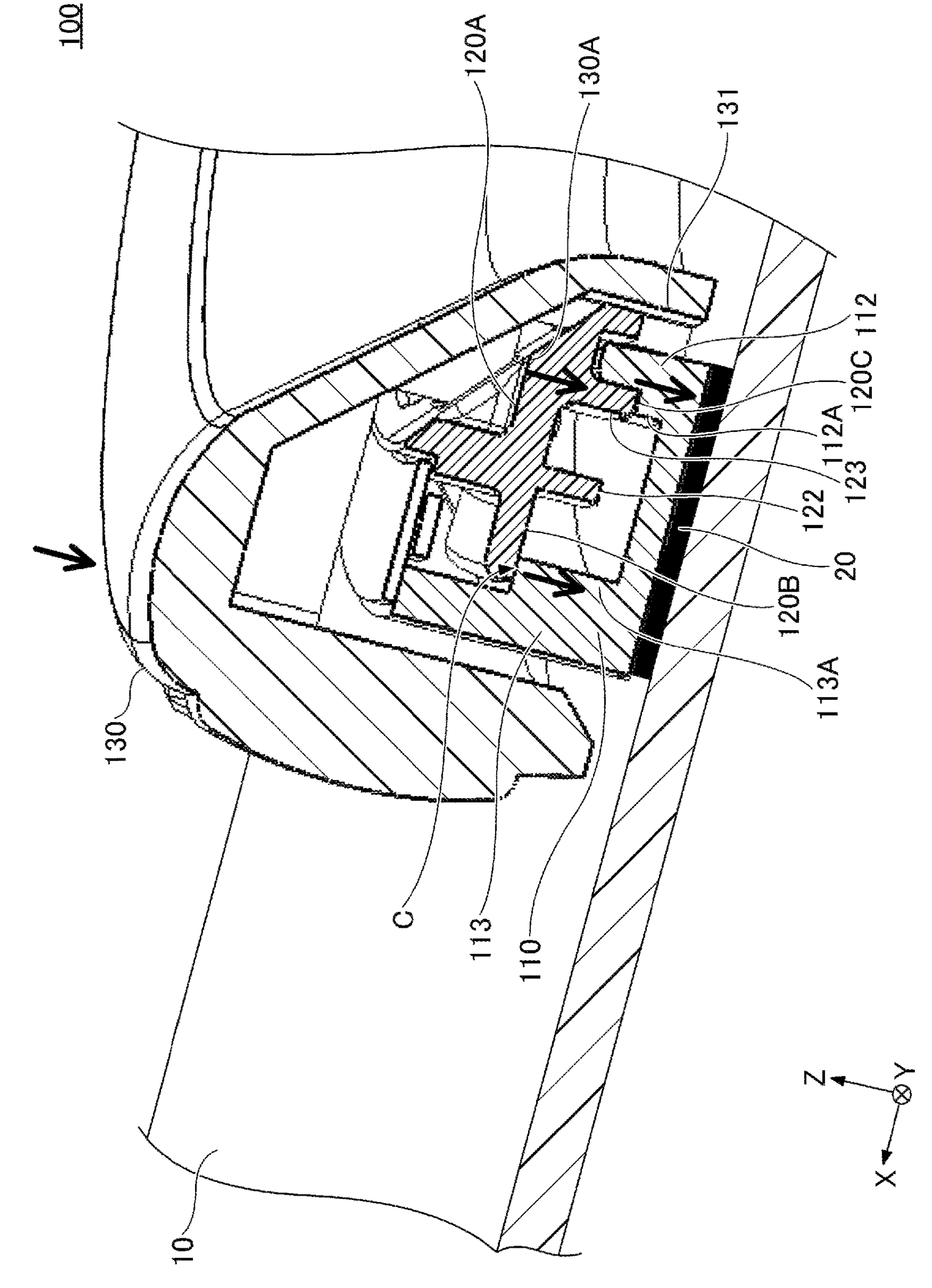
FIG. 7 is another partially enlarged view of the rotary operating device of FIG. 4.

FIG. 7 is another partially enlarged view of the rotary operating device 100 of FIG. 4.

As illustrated in FIG. 7, a lower end surface 120C of the peripheral wall 123, located radially inward, of the rotating shaft member 120 contacts the upper surface of a stepped portion 112A provided on the outer peripheral surface of the inner peripheral wall 112 of the case 110.

Further, as illustrated in FIG. 7, a lower surface 120B on the outer peripheral edge, located radially outward, of the rotating shaft member 120 contacts the upper surface of a stepped portion 113A provided on the inner peripheral surface of the outer peripheral wall 113 of the case 110. This contact portion is provided annularly and continuously except for the notch portion 113B of the outer peripheral wall 113 of the case 110 and the vicinity of the notch portion 113B. Therefore, when the rotary operating device 100 is installed such that the notch portion 113B is on the lower side of the case 110 in the direction of gravity, the upper side of the case 110 in the direction of gravity can be closed annularly. Accordingly, the waterproof effect of the case 110 can be enhanced.

Further, as illustrated in FIG. 7, the upper surface 120A on the inner peripheral edge, located radially inward, of the rotating shaft member 120 contacts a ceiling surface 130A on the inner cylindrical portion 131 side of the knob 130.

Accordingly, in the rotary operating device 100 according to the embodiment, as indicated by the thick arrow in FIG. 7, pressure applied from above to the knob 130 can be received by the upper surface 120A of the rotating shaft member 120, and dispersed to the inner peripheral wall 112 of the case 110 and the outer peripheral wall 113 of the case 110.

Therefore, in the rotary operating device 100 according to the embodiment, pressure, applied from above to the knob 130 when the bottom surface of the case 110 is bonded to the installation surface 10 by a double-sided tape 20 (an example of an "adhesive"), can be dispersed to the inner peripheral wall 112 side and the outer peripheral wall 113 side of the bottom surface of the case 110. Accordingly, the rotary operating device 100 according to the embodiment can reduce non-uniformity of the adhesion of the double-sided tape 20, thereby further increasing the adhesion strength of the double-sided tape 20.

Note that grease is applied (to a portion indicated by the arrow C in FIG. 7) between the lower surface 120B of the rotating shaft member 120 and the upper surface of the stepped portion 113A of the case 110. Thus, the sliding resistance when the rotating shaft member 120 is rotated is reduced.

According to an embodiment, a rotary operating device can prevent a sensor provided therein from becoming wet, without a seal member.

Although specific embodiments of the present invention have been described above, the present invention is not limited to the above-described embodiments. Variations and modifications may be made without departing from the scope of the present invention.

What is claimed is:

1. A rotary operating device comprising:

a case having a cavity, the cavity having an annular shape with an opening at a top;

a rotating shaft member having an annular shape, rotatable with respect to the case, and closing the cavity;

an operation member having an annular shape with an opening at a bottom, covering the cavity, engaging with the rotating shaft member, and rotating together with the rotating shaft member; and a sensor disposed within the cavity to detect rotation of the rotating shaft member, wherein the case has an inner peripheral wall having an annular shape, wherein the operation member has an inner cylindrical portion having an annular shape, wherein the rotating shaft member has a peripheral wall that extends downward and extends along an outer peripheral surface of the inner peripheral wall, and wherein a first gap between the inner peripheral wall of the case and the peripheral wall of the rotating shaft member is smaller than a second gap between an inner peripheral surface of the rotating shaft member and the inner cylindrical portion of the operation member.

2. The rotary operating device according to claim 1, wherein the case has an outer peripheral wall having an annular shape, a lower end surface of the peripheral wall of the rotating shaft member contacts an upper surface of a first stepped portion provided on the outer peripheral surface of the inner peripheral wall of the case, and a lower surface of an outer peripheral edge of the rotating shaft member contacts an upper surface of a second stepped portion provided on an inner peripheral surface of the outer peripheral wall of the case.

3. The rotary operating device according to claim 2, wherein a bottom surface of the case is bonded to an installation surface by an adhesive.

4. The rotary operating device according to claim 1, wherein the case has a notch portion from which a flexible substrate extends, the notch portion being situated on a lower side in a direction of gravity upon installing the rotary operating device on an inclined installation surface.

5. The rotary operating device according to claim 4, further comprising a lid having an annular shape and attached to the case so as to restrict upward movement of the rotating shaft member, wherein the lid has a pressing portion on an outer peripheral edge of the lid, the pressing portion being situated on the lower side in the direction of gravity, projecting downward, and pressing down on a surface of the flexible substrate that extends from the notch portion.

6. The rotary operating device according to claim 4, wherein the case has a stepped portion that is provided annularly and continuously on an inner peripheral surface of an outer peripheral wall except for the notch portion and a vicinity of the notch portion, and a lower surface of an outer peripheral edge of the rotating shaft member contacts an upper surface of the stepped portion.

* * * * *